United States Patent
York et al.

(10) Patent No.: US 11,408,710 B2
(45) Date of Patent: Aug. 9, 2022

(54) BATTERY COMPARTMENT FOR SIGHTING DEVICE

(71) Applicant: Sig Sauer, Inc., Newington, NH (US)

(72) Inventors: Andrew W. York, Portland, OR (US); Drew Essig, Portland, OR (US)

(*) Notice: Subject to any disclaimer, the term of this patent is extended or adjusted under 35 U.S.C. 154(b) by 0 days.

(21) Appl. No.: 17/133,249

(22) Filed: Dec. 23, 2020

(65) Prior Publication Data

US 2021/0116213 A1 Apr. 22, 2021

Related U.S. Application Data

(63) Continuation-in-part of application No. 16/749,925, filed on Jan. 22, 2020, now abandoned.

(60) Provisional application No. 62/796,022, filed on Jan. 23, 2019.

(51) Int. Cl.
| | |
|---|---|
| *F41G 1/30* | (2006.01) |
| *H01M 50/247* | (2021.01) |
| *F41G 1/16* | (2006.01) |
| *F41G 1/02* | (2006.01) |

(52) U.S. Cl.
CPC ............. *F41G 1/30* (2013.01); *F41G 1/02* (2013.01); *F41G 1/16* (2013.01); *H01M 50/247* (2021.01)

(58) Field of Classification Search
CPC ............. F41G 1/30; F41G 1/02; F41G 1/16
USPC .......................................................... 42/113
See application file for complete search history.

(56) References Cited

U.S. PATENT DOCUMENTS

| | | | |
|---|---|---|---|
| 6,327,806 B1 * | 12/2001 | Paige .................. | F41G 1/30 42/113 |
| 7,484,856 B1 | 2/2009 | Newhall et al. | |
| 7,647,721 B1 | 1/2010 | Gaber et al. | |
| 8,024,885 B1 | 9/2011 | Newhall et al. | |
| 8,082,688 B2 | 12/2011 | Elpedes et al. | |
| 8,186,093 B1 | 5/2012 | Chung | |
| 8,296,991 B1 | 10/2012 | Chung | |
| 8,443,541 B2 | 5/2013 | Elpedes et al. | |
| 8,915,392 B2 * | 12/2014 | Crispin ................ | F41G 1/38 42/122 |
| 9,267,759 B2 * | 2/2016 | Speroni ............... | F41G 1/00 |
| 9,423,212 B2 | 8/2016 | Campean | |
| 9,958,234 B2 | 5/2018 | Campean | |
| 10,139,197 B1 | 11/2018 | Horton et al. | |
| 10,254,532 B2 | 4/2019 | Collin | |
| 10,514,233 B2 * | 12/2019 | Sun .................... | F41G 1/345 |
| 2006/0196099 A1 * | 9/2006 | Matthews .......... | F41G 11/003 42/146 |

(Continued)

FOREIGN PATENT DOCUMENTS

| | | | | |
|---|---|---|---|---|
| CN | 204268973 U | * | 4/2015 | |
| CN | 206019474 U | * | 3/2017 | |

(Continued)

*Primary Examiner* — Jonathan C Weber
(74) *Attorney, Agent, or Firm* — Miller Nash, LLP

(57) ABSTRACT

A sighting device includes a base portion structured to be mounted to a gun, a battery powered accessory, and a battery receiver structured to contain a battery for the battery powered accessory. The battery receiver has a closed position in which the battery receiver is contained within the base portion as well as an open position in which the battery receiver is at least partially separated from the base portion. The sighting device includes a manually operated release button that, when pressed, causes the battery receiver to be released from the closed position.

16 Claims, 4 Drawing Sheets

(56) References Cited

U.S. PATENT DOCUMENTS

| | | | |
|---|---|---|---|
| 2010/0175297 A1* | 7/2010 | Speroni | F41G 1/35 42/114 |
| 2013/0008072 A1 | 1/2013 | Chung | |
| 2013/0180152 A1* | 7/2013 | Speroni | F41G 1/35 42/99 |
| 2014/0109456 A1 | 4/2014 | Jung et al. | |
| 2014/0109457 A1* | 4/2014 | Speroni | F41G 1/35 42/114 |
| 2014/0237884 A1 | 8/2014 | Koesler et al. | |
| 2014/0305022 A1 | 10/2014 | Chung | |
| 2015/0198415 A1 | 7/2015 | Campean | |
| 2016/0377377 A1 | 12/2016 | Collin | |
| 2016/0377378 A1 | 12/2016 | Collin | |
| 2017/0363387 A1* | 12/2017 | Sun | H02S 10/40 |

FOREIGN PATENT DOCUMENTS

| | | | | |
|---|---|---|---|---|
| CN | 206019475 U | * | 3/2017 | |
| CN | 207570405 U | * | 7/2018 | |
| CN | 208538935 U | * | 2/2019 | |
| CN | 110071235 A | * | 7/2019 | ............. G02B 23/10 |
| GB | 2317711 A | * | 4/1998 | ............. G02B 23/10 |

* cited by examiner

BATTERY COMPARTMENT FOR SIGHTING DEVICE

CROSS-REFERENCE TO RELATED APPLICATIONS

This application is a continuation-in-part of U.S. non-provisional patent application Ser. No. 16/749,925, titled REFLEX SIGHT HAVING MODULAR HOOD, filed Jan. 22, 2020, which is a non-provisional of and claims benefit of U.S. provisional patent application No. 62/796,022, filed Jan. 23, 2019, titled REFLEX SIGHT HAVING MODULAR HOOD, the disclosures of both of which are incorporated herein by reference in their entirety.

BACKGROUND

Reflex type gun sights provide a shooter a quick and easy way to sight a target compared to conventional iron sights. Reflex sights are optical sights that include a partially reflecting element on which an aiming light or target is projected. The projected light reflects from the reflecting element, such as a lens or other optic, and the reflection is seen by the shooter as being superimposed on the target or field of view.

As reflex sights include a powered light source, they also include a power source, which is typically a battery. A coin or button battery is oftentimes used to power sights as the compact shape is convenient and unobtrusive. Most reflex sights retain the battery by capturing it between the bottom of the sight and the gun slide, to which the reflex sight is mounted. One problem with such an arrangement is that the sight must be removed from the slide to change the battery. After the sight has been removed from the slide, the battery changed, and the sight reattached, the sight must be re-calibrated or re-zeroed. This re-calibration takes extra time and requires extra ammunition. Other reflex sights have battery compartments on top of the main body of the housing, residing behind the lens. Although changing a battery that is mounted in this top area does not require re-calibration, it is difficult to remove and re-install batteries in such a crowded space. Yet other sights include side-loading battery trays, but must be retained, such as with a screw, otherwise the trays become dislodged from the housing due to the shooting forces. Requiring a screw is inconvenient as it means the shooter must also carry a tool, such as a screwdriver or multi-tool to remove the screw should the battery need to be changed in the field.

Embodiments of the invention address these and other limitations of the prior art.

DETAILED DESCRIPTION

Figure 1:
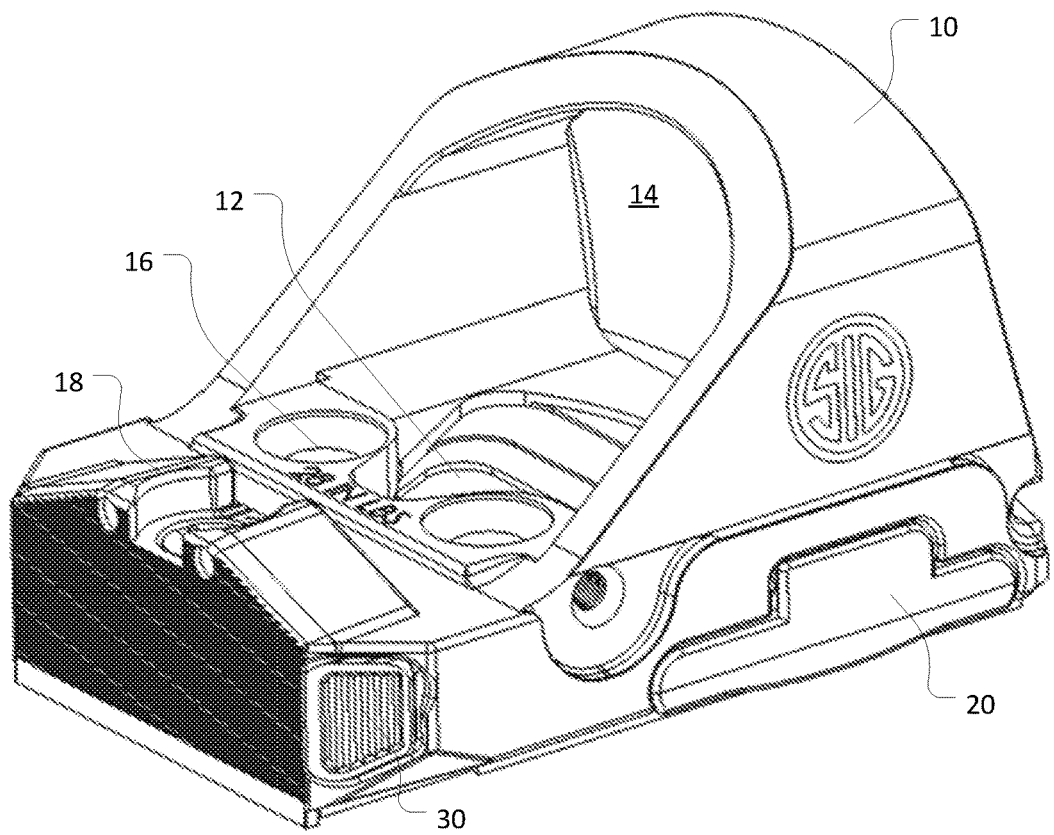
FIG. 1 is a rear perspective line diagram that illustrates an example of an open reflex sight including a battery drawer that needs no tools to open, according to embodiments of the invention.

FIG. 1 is a rear perspective line diagram that illustrates an example of a sight 10 including a battery drawer or tray 20 that needs no tools to open. Although the example sight 10 in FIG. 1 is an open reflex sight, embodiments of the invention are operative with any type of powered sight or accessory typically mounted on a gun. Illustrated in FIG. 1 is the sight 10, which includes a battery powered emitter 12 structured to generate a visible light target and project it toward a reflective screen or lens 14. The visible light target may be a red dot, or other colored dot, or may be a crosshair, open crosshair or any other type of target that may help a shooter aim the gun to which the sight 10 is mounted. The generated target is projected by the emitter 12 toward the reflective lens 14, which has the optical properties of reflecting the target back to the eye of the shooter. The reflected target has the property of being superimposed on what the shooter sees through the reflective lens 14. Since the target is reflected off of the reflective lens 14, sights such as those illustrated in FIG. 1 are often called reflex sights.

The base portion or housing of the sight 10 includes mounting holes 16, through which mounting screws may be used to mechanically fasten the sight to a slide or rail or other component of a gun. In other embodiments the sight 10 may be mounted to a firearm in another manner. The sight 10 further includes a rear sight 18, which the shooter may use in conjunction with a front sight of the gun to aim the gun at the desired target. In some embodiments the sight 10 or its components may be formed out of metal, such as anodized aluminum, and specifically out of 7075 anodized aluminum. In other embodiments the sight 10 or its components may be formed out of other metal, durable plastic, or other suitable material. In yet other embodiments the sight 10 may be formed mostly out of aluminum and include plastic components, or may be formed mostly out of plastic and include aluminum or other metal components.

Figure 2:
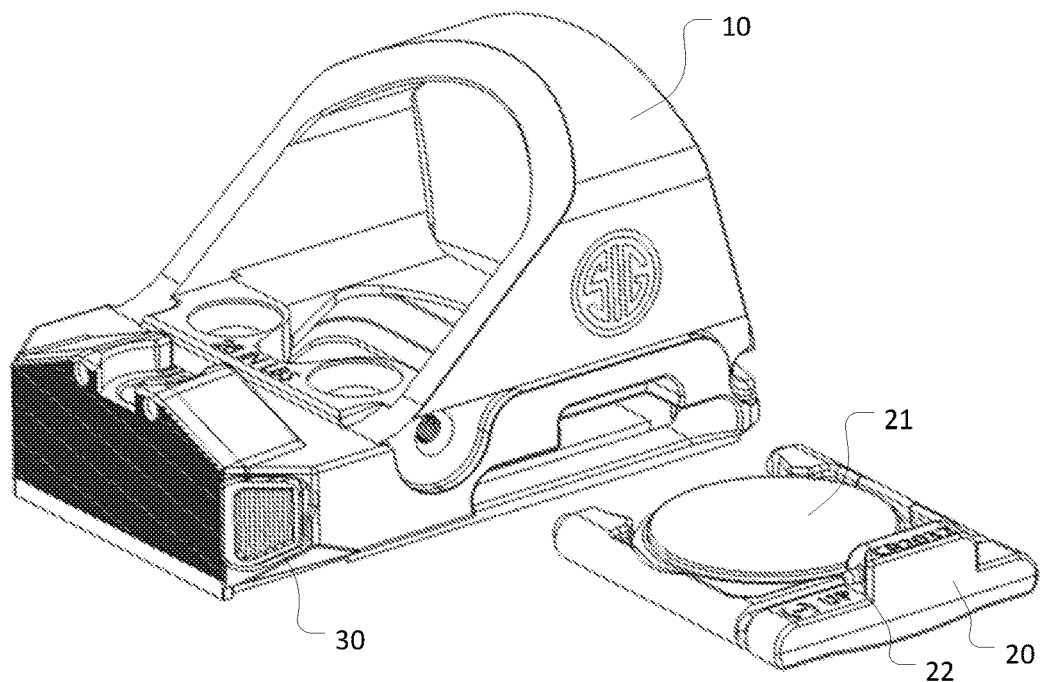
FIG. 2 is a rear perspective line diagram of the open reflex sight of FIG. 1 illustrating the battery drawer in an open position.

A sight 10 according to embodiments of the invention include a battery tray 20 for holding a battery that powers the emitter 12 or other battery powered accessory. In its closed position, the battery tray 20 is stored and maintained within a housing of the sight 10, as illustrated in FIG. 1. In the closed position the battery is in electrical continuity with the emitter 12, with a switch (not illustrated) used to control the operation of the emitter. A user may use a release button 30, to cause the battery tray 20 to change to its open position, as illustrated in FIG. 2. Notably, unlike battery trays of prior accessories, no tool is needed for the user to cause the battery tray 20 to open. Instead, the user manually presses the release button 30 to cause the battery tray 20 to separate from the body of the sight 10 and change to its open position. In the open position, as illustrated in FIG. 2, a battery 21 may be removed or inserted into the battery tray 20. Although, for clarity, FIG. 2 shows the battery tray 20 completely separated from the sight 10, in practice the battery tray is mechanically retained within the sight and does not completely separate in standard operation.

Also shown in FIG. 2 is a retainer pin 22, which is carried within the battery tray 20. The retainer pin 22 may be formed of metal, such as stainless steel, or steel with a hardened coating, such as MELONITE. The retainer pin 22 mechanically keeps the battery tray 20 in its closed position, unless and until the release button 30 is depressed, which frees the battery tray from the closed to open position, as described in detail below.

Figure 3:
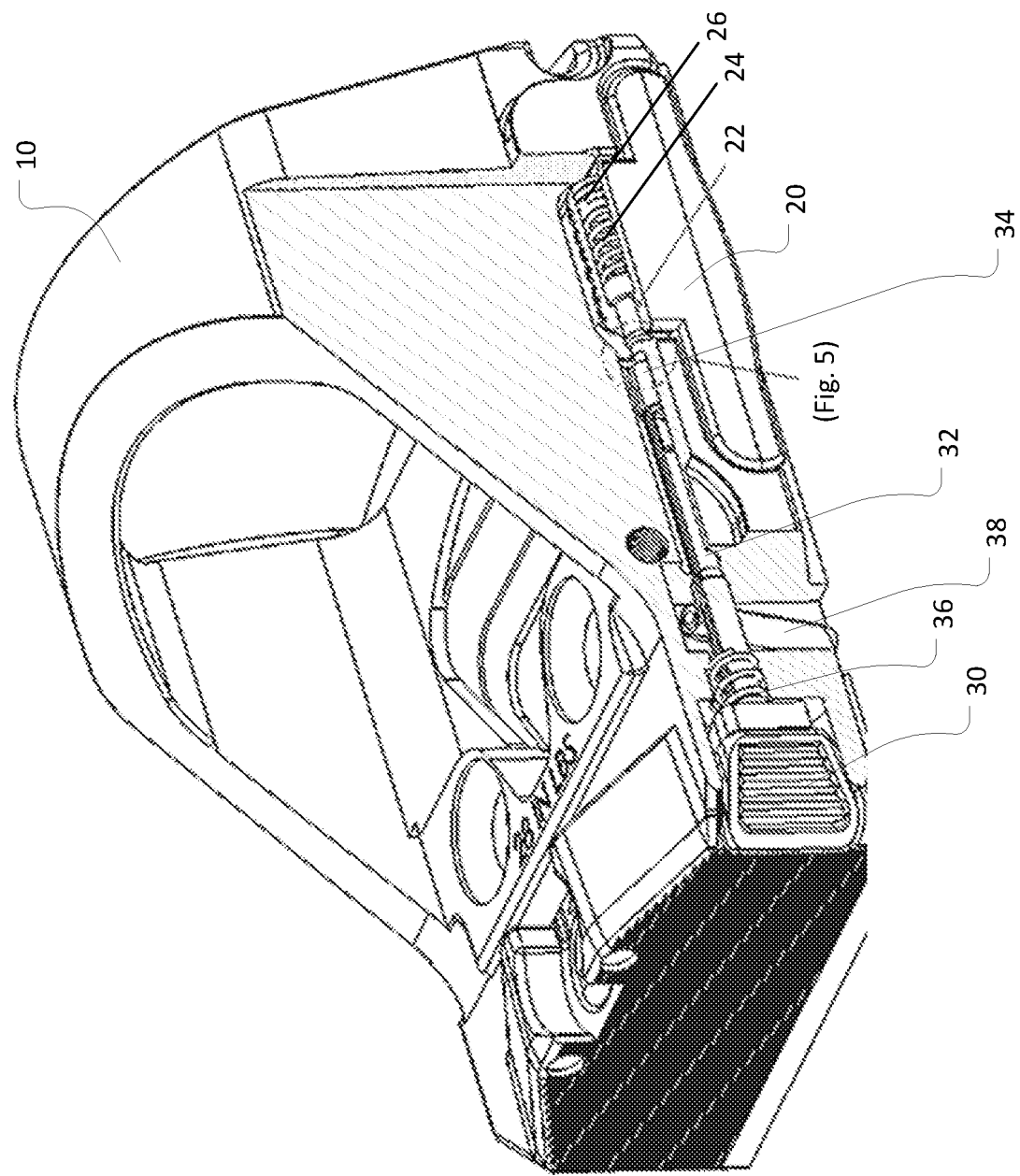
FIG. 3 is a rear perspective line diagram of the open reflex sight of FIG. 1, including a partial cutaway section illustrating components of the reflex sight that allow the battery drawer to be accessed without tools.

FIG. 3 is a partial cutaway section illustrating components of the sight 10 that allow the battery drawer 20 to be accessed without tools. As shown in FIG. 3, the release button 30 is coupled through a release shaft 32 to a release or button end 34. The release shaft 32 is carried by a shaft opening within the body of the sight 10, which is shaped to allow the release shaft 32 to move along its long axis within the shaft opening when pressed by a user. The release shaft 32 may be formed of metal or durable plastic, such as a polymer plastic. A cross pin 38 may be placed in the base or housing of the sight 10 in a position that causes the pin to rest in an elongated notch of the release shaft 32. In this position, the cross pin 38 allows the button shaft 32 to move within the housing while also retaining the button assembly within the housing. The cross pin 38 may be formed of stainless steel or other durable material. The cross pin 38 is inserted into the housing after the button assembly has been inserted into the housing, thus retaining the button assembly within the housing.

A button compression spring 36 may be mounted at either the near end or distal end of the release shaft 32. The compression spring 36 maintains the release button 30 in its resting position. A user may press the release button 30 to overcome the spring force of the compression spring 36 and cause the button to change from its resting position to its operating position, where it moves through the shaft opening to contact the retainer pin 22 in the battery tray 20. If the button force is also enough to overcome the force of a preload retainer pin spring 24, also in the battery tray 20, then the user, by pressing the release button 30, causes the retainer pin 22 of the battery tray to be released from the body of the sight 10. Details of the mechanical structure are best seen in FIG. 5, which is an enlarged view of the section illustrated in FIG. 3.

Figure 4:
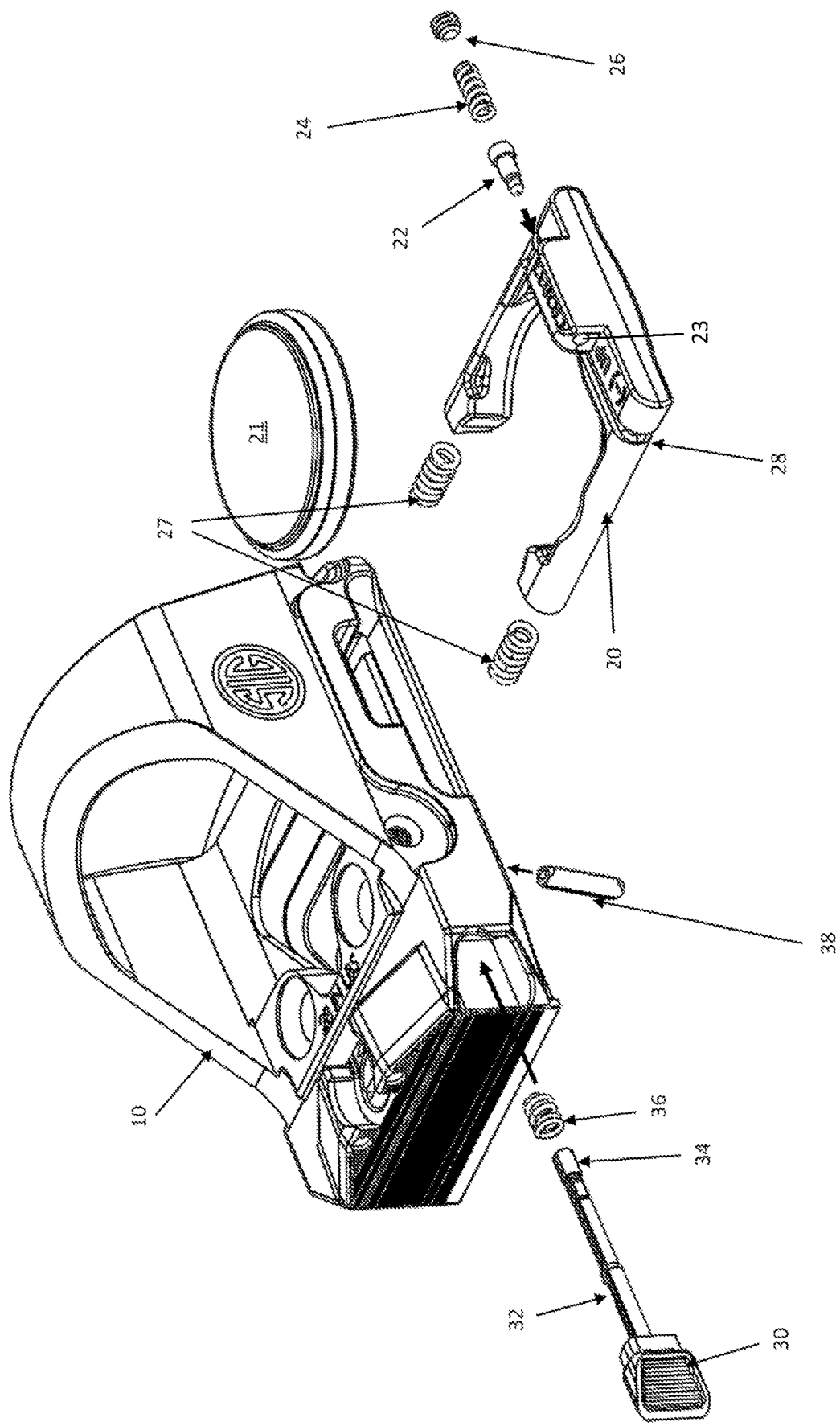
FIG. 4 is a rear perspective exploded view illustrating components of a battery compartment for a sighting device according to embodiments of the invention.

FIG. 4 is a rear perspective exploded view illustrating additional components of the sight 10. Many of the components of the button assembly, such as the button 30, release shaft 32, button end 34, button compression spring 36, and cross pin 38 were described in detail with reference to FIG. 3 above and will not be further described for brevity. Battery tray 20 is shaped and sized to hold and contain the battery 21 within the housing of the sight 10. As described above, the battery tray 20 also includes a retainer pin 22, which is captured and held in place within an opening 23 of the battery tray. A preload retainer spring 24 holds the retainer pin 22 in place so that the resting position of the retainer pin 22 extends beyond the edge of the battery tray 20, as depicted best in FIGS. 2 and 5. A set screw 26 keeps the preload retainer spring 24 as well as the retainer pin 22 in place within opening 23 of the battery tray 20. In some embodiments the set screw 26 may have enough travel within the battery tray 20 to allow adjustment of the amount of pressing force required to be overcome by the user pressing the release button 30 to release the battery tray 20 from the sight 10. In other words, tightening the set screw 26 may increase the amount of force the preload retainer spring 24 applies to the retainer pin 22 in its resting state. In operation, the user must overcome the combined forces of the button compression spring 36 as well as the force of the preload retainer spring 24 to cause the retainer pin 22 to move from its resting state to its release position. Thus, allowing the preload retainer spring 24 to be adjustable allows the user to be able to increase or decrease the total force necessary to cause the button 30 to release the battery tray 20 from the sight 10.

The battery tray 20 may be formed of a molded polymer, such as glass-filled nylon. In some embodiments the battery tray is made from 30% glass-filled nylon. In other embodiments the battery tray is made from a durable plastic or metal. An o-ring 28 may be inserted into a receiving groove of the battery tray 20. The o-ring is structured to partially deform when the battery tray 20 is inserted into the sight 10, thereby preventing water intrusion, and making the sight water resistant.

Figure 5:
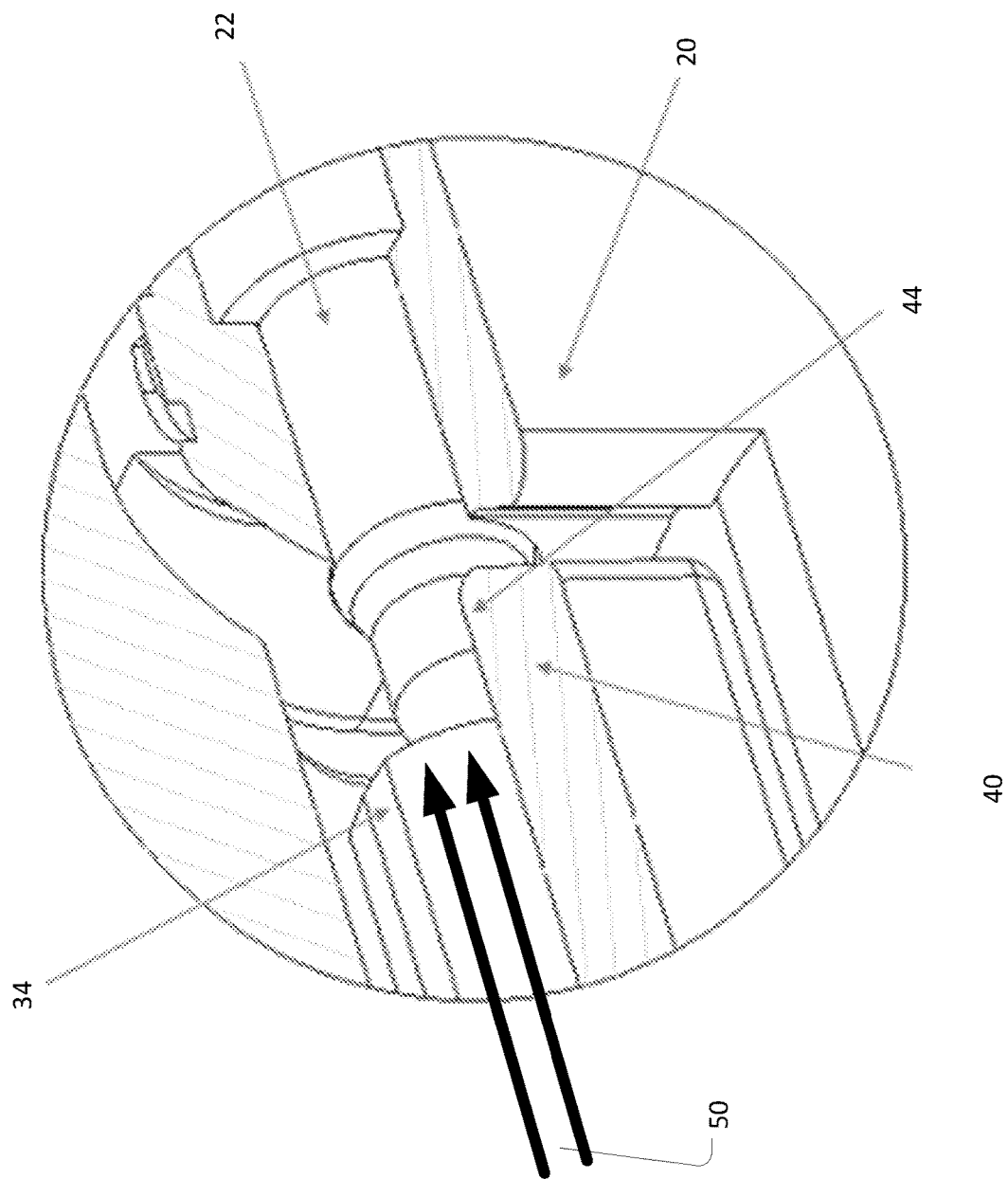
FIG. 5 is an enlarged view of a portion of the cutaway section of FIG. 3 illustrating internal components of the reflex sight.

FIG. 5 is an enlarged view of a portion of the cutaway section of FIG. 3 illustrating internal components of the sight 10. Illustrated in FIG. 5 are the button end 34 of the button shaft 32, the retaining pin 22 that is carried within the battery tray 20, as well as a portion of the battery tray itself. Also illustrated in FIG. 5 are a release portion 44 and a support portion 40 of the base or housing of the sight 10.

In the resting position the battery tray 20 is held in place due to the mechanical interference of the retainer pin 22 with the release portion 44 of the housing. In some embodiments the release portion 44 is a lip or edge of the support portion 40 of the base or housing of the sight 10. Recall from FIG. 4 that the eject springs 27 bias the battery tray 20 away from the housing. But, when the retainer pin 22 is in the position as indicated in FIG. 5, the interference with release portion 44 maintains the battery tray 20 in place, as the retainer pin 22 does not allow the battery tray to separate from the sight 10. Then, when the user presses the release button 30, as illustrated with force arrows 50, the button end 34 of the button shaft 32 moves toward and contacts the retainer pin 22, if it is not already in contact with the retainer pin in its resting position. After contacting the retainer pin 22, and with further pressure overcoming the force of the preload retainer pin spring 24 (FIG. 4), the retainer pin 22 moves away from the button 30 in the same direction as the force arrows 50. When the retainer pin 22 has traveled just past the release portion 44 of the housing, there is no longer anything retaining the battery tray 20 within the housing of the sight 10. Then, the eject springs 27 push the battery tray 20 away from the housing of the sight 10 to the open position of the battery tray. In some embodiments the battery tray 20 is retained within the housing of the sight 10 so that the battery tray does not completely separate from the housing of the sight 10.

The user may close the battery tray 20 in one of two ways. First, the user may again depress the release button 30 while pressing the battery tray 20 into the housing of the sight 10. Then, after the battery tray 20 is in its closed position, the release button 30 is released. The retaining pin 22 then keeps the battery tray 20 in its closed position. In other embodiments, due to the beveled or angled shape of the release portion 44 of the housing, as illustrated in FIG. 5, pressing the release button 30 is unnecessary when closing the battery tray. In this method, as the battery tray 20 is closing, the retainer pin 22 contacts the beveled surface of the release portion 44. Then, as the user presses the battery tray toward the sight 10, the beveled surface causes the retainer pin 22 to move laterally within the opening 23 of the battery tray to press against and compress the preload retainer pin spring 24 (FIG. 4). With continued pressing, eventually the retainer pin 22 clears the edge of the release portion 44 of the housing. Once the retainer pin 22 clears the edge of the release portion 44 of the housing, the retainer pin 22, under force from the compressed preload retainer pin spring 24, snaps into place against or near the button end 34 of the release shaft 32 as illustrated in FIG. 5. Then, the battery tray 20 is again retained within the housing of the sight 10 by the retainer pin 22 being held on the inside of the release portion 44 of the housing, while, at the same time, the eject springs 27 (FIG. 4) bias the retainer pin 22 against the housing, retaining the battery tray.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical" and "horizontal" are used for convenience and in reference to the views provided in figures. But the disclosed components may have a number of orientations in actual use. Thus, a feature that is vertical or horizontal in the figures may not have that same orientation or direction in actual use.

Although specific embodiments have been illustrated and described for purposes of illustration, it will be understood that various modifications may be made without departing from the spirit and scope of the disclosure.

The invention claimed is:

1. A battery powered accessory for mounting to a gun, comprising:
   a base portion structured to be mounted to the gun;
   a battery powered accessory; and
   a battery receiver structured to contain a battery for the battery powered accessory, the battery receiver having a closed position in which the battery receiver is contained within the base portion by a retainer pin assembly including a retainer pin and retainer pin spring, and the battery receiver having an open position in which the battery receiver is at least partially separated from the base portion; and
   a manually operated release button that, when pressed, moves the retainer pin to cause the battery receiver to be released from the closed position.

2. The accessory according to claim 1, in which the retainer pin assembly further comprises a retaining screw.

3. The accessory according to claim 2, in which the retainer pin assembly is mechanically retained by the retaining screw within a void disposed within the battery receiver.

4. The accessory according to claim 1, in which, in the closed position, the retainer pin mechanically interferes with an edge or lip of the base portion.

5. The accessory according to claim 4, in which the mechanical interference prevents the battery receiver from separating from the base portion.

6. The accessory according to claim 5, in which a distal end of the release button is structured to contact the retainer pin.

7. The accessory according to claim 6, in which pressure applied to the release button causes the retaining pin to translate past the edge or lip of the base portion and eliminate the mechanical interference between the retainer pin and the base portion.

8. The accessory according to claim 4, in which the lip of the base portion has an angled or beveled surface.

9. A battery powered reflex sight for mounting to a gun, comprising:
   a base portion structured to be mounted to the gun;
   a reflecting surface coupled to the base portion;
   a battery powered target emitter structured to generate a target light and project the target light on the reflecting surface; and
   a battery tray structured to contain a battery for the reflex sight, the battery tray having a closed position in which the battery tray is contained within the base portion by a retainer pin assembly including a retainer pin and retainer pin spring, and the battery tray having an open position in which the battery tray is at least partially separated from the base portion; and
   a manually operated release button that, when pressed, moves the retainer pin to cause the battery tray to be released from the closed position.

10. The reflex sight according to claim 9, in which the retainer pin assembly further comprises a retaining screw.

11. The reflex sight according to claim 10, in which the retainer pin assembly is mechanically retained by the retaining screw within a void disposed within the battery tray.

12. The reflex sight according to claim 9, in which, in the closed position, the retainer pin mechanically interferes with an edge or lip of the base portion.

13. The reflex sight according to claim 12, in which the mechanical interference prevents the battery tray from separating from the base portion.

14. The reflex sight according to claim 13, in which a distal end of the release button is structured to contact the retainer pin.

15. The reflex sight according to claim 14, in which pressure applied to the release button causes the retaining pin to translate past the edge or lip of the base portion and eliminate the mechanical interference between the retainer pin and the edge or lip of the base portion.

16. The reflex sight according to claim 12, in which the lipped portion of the base portion has an angled or beveled surface.

* * * * *